United States Patent [19]

Absenger

[11] 4,341,187

[45] Jul. 27, 1982

[54] SEAL FOR INTERNAL COMBUSTION ENGINE HAVING A NOISE-DEADENING SHROUD

[75] Inventor: Erich Absenger, Ruhstorf, Fed. Rep. of Germany

[73] Assignee: Motorenfabrik Hatz GmbH & Co. KG, Ruhstorf, Fed. Rep. of Germany

[21] Appl. No.: 91,442

[22] Filed: Nov. 5, 1979

[30] Foreign Application Priority Data

Dec. 21, 1978 [DE] Fed. Rep. of Germany ....... 2855220

[51] Int. Cl.[3] ...................... F02B 77/00; G10K 11/00; F16L 55/02

[52] U.S. Cl. ................................ 123/198 E; 181/204; 285/9 R

[58] Field of Search .................... 181/204; 123/195 S, 123/198 E, 195 C; 138/113, 114; 285/9 R, 267, 355

[56] References Cited

U.S. PATENT DOCUMENTS

| | | | |
|---|---|---|---|
| 3,540,761 | 11/1970 | Barlow | 285/355 X |
| 3,684,053 | 8/1972 | Fachbach et al. | 181/204 |
| 4,149,512 | 4/1979 | Hatz | 181/204 X |

FOREIGN PATENT DOCUMENTS

| | | | |
|---|---|---|---|
| 258408 | 12/1911 | Fed. Rep. of Germany | 285/9 R |

*Primary Examiner*—L. T. Hix
*Assistant Examiner*—Thomas H. Tarcza
*Attorney, Agent, or Firm*—Blanchard, Flynn, Thiel, Boutell & Tanis

[57] ABSTRACT

A seal for use on a noise-deadening shroud encasing an internal combustion engine, particularly the portion thereof which encases the muffler. A gap is formed between the outlet pipe for the muffler and the wall of the opening in the enclosure for the muffler. A seal is provided for this gap and includes a closure member which surrounds the exhaust outlet pipe with very little clearance therebetween.

5 Claims, 3 Drawing Figures

SEAL FOR INTERNAL COMBUSTION ENGINE HAVING A NOISE-DEADENING SHROUD

FIELD OF THE INVENTION

The invention relates to a seal for the structure disclosed in U.S. Pat. No. 4,149,512, which structure includes an internal combustion engine equipped with a silencing casing and having a special enclosure for the muffler wherein the exhaust pipe of the muffler extends through an opening in the enclosure without directly contacting the enclosure and the seal prevents the flow of exhaust gases into the enclosure.

BACKGROUND OF THE INVENTION

It has been shown that in the case of a strong pressure accumulation in front of the exhaust gas outlet pipe of the muffler, which is created for example by using a long exhaust pipe connected to the outlet pipe, a portion of the exhaust gas can pass through the mentioned opening into the inside of the enclosure and can here result in undesired side effects, such as thermal overload and/or contamination of the inner chambers of the sound-deadening shroud.

The purpose of the present invention is to avoid such disadvantages by providing a further development of the arrangement which is disclosed in the aforesaid U.S. Pat. No. 4,149,512. This purpose is inventively attained by providing in the annular gap between the exhaust gas outle pipe of the muffler and the wall of the opening in the enclosure at least one cover member, which grips around the exhaust outlet pipe with little play to close the annular gap.

BRIEF DESCRIPTION OF THE DRAWING

Several embodiments of the invention are discussed in the following description with reference to the drawing, in which.

DETAILED DESCRIPTION

Figure 1:
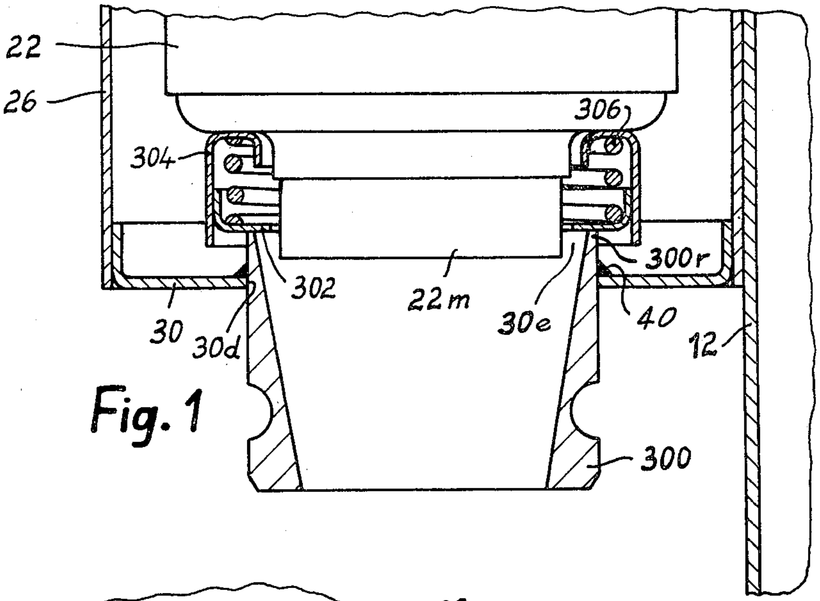
FIG. 1 illustrates a cross-sectional view of a first type of construction of the cover member.

The muffler 22 which in the drawing is only partially illustrated—as discussed in detail in U.S. Pat. No. 4,149,512 and reference thereto is incorporated herein—is surrounded by the special enclosure 26, 30 such that an air gap is created between the outlet pipe 22*m* and the wall of an openin 30*d* in the wall section 30. The muffler 22 is secured to the engine body and the enclosure 26, 30 to the casing 12. The casing 12 surrounds the engine body for the purpose of the silencing of same as disclosed in the aforesaid patent. The annular gap 30*e* results between the exhaust outlet pipe 22*m* and a pipe connection 300 which is telescopically disposed around and is secured on the enclosure part 30 in the opening 30*d* an any conventional manner, as by welds 40.

A generally cup-shaped cover plate 302, which is sealingly surrounded by a sleeve 304, engages the annular seal surface on the edge 300r of the pipe connection 300 as shown in FIG. 1. A spring 306 is positioned between the cover plate 302 and the sleeve 304 to press the cover plate 302 against the edge 300*r* of the pipe connection 300 and the inwardly extending overturned edge of the sleeve 304 against the underside of the muffler 22 in the manner that the inside of the enclosure 26, 30 is securely sealed off with respect to the outer region in front of the outlet pipe 22*m*.

In this manner, the exhaust gases which exit from the muffler 22 cannot enter inside of the enclosure. 26, 30 not even when a longer connecting pipe (as is illustrated in FIG. 7 of the aforesaid U.S. patent) is connected to the wall section 30 following the exhaust outlet pipe 22*m* and thus a certain back pressure is created in the exhaust gas flow, which spreads out also within the pipe connection 300 and in the annular gap 30*e*. In this manner, the inner chambers of the enclosure 26, 30 are protected against the exhaust gas flow, so that here undesired side effects (thermal overload, contamination and others) do not occur.

Figure 2:
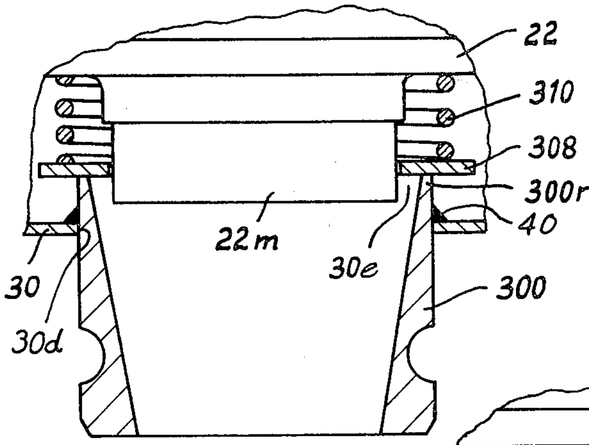
FIGS. 2 and 3 are two further embodiments in a similar type illustration.

FIG. 2 illustrates a different exemplary embodiment of the subject matter of the invention. The cover member is here constructed as a flat ring 308, which closely grips around the exhaust outlet pipe 22*m* and is pressed against the edge 300*r* of the pipe connection 300 by a spring 310 which engages and extends between the ring 308 and the muffler 22.

Figure 3:
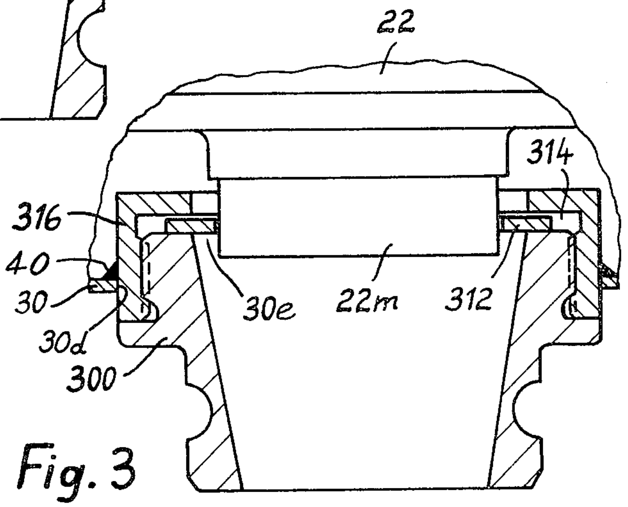

A further type of construction is illustrated in FIG. 3, wherein the cover member is constructed as a snap ring 312, which rests on the edge 300*r* of the pipe connection 300 and closely grips around the exhaust outlet pipe 22*m*. The periphery of the snap ring 312 is held in a guide groove 314, which is formed between the edge 300*r* on pipe connection 300 and a radially inwardly extending flange 317 on a screw cap 316 which is threadedly engaged thereon.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An exhaust arrangement for an internal combustion engine, comprising:

exhaust means supported on said engine for conducting exhaust gases away from said engine, said exhaust means having an outlet pipe at the end thereof remote from said engine;

a sound-deadening enclosure surrounding and spaced from said exhaust means, said enclosure being supported on said engine independently of said exhaust means and having a pipe connection extending through and securely supported on a wall thereof, said outlet pipe being telescopically disposed within and free of contact with the end of said pipe connection which is within said enclosure;

an annular seal surface provided on the axially facing surface on said of said pipe connection;

an annular cover member closely encircling said outlet pipe and engaging said annular seal surface; and first means for maintaining said cover member in sealing engagement with said seal surface on said pipe connection.

2. The exhaust arrangement of claim 1, wherein said cover member is a snap ring and said first means includes an annular screw cap which encircles said outlet pipe, is fixedly secured to said enclosure and threadedly engages said end of said pipe connection in said enclosure, said screw cap having an inwardly extending flange which is spaced axially a small distance from said seal surface on said pipe connection, the region between said screw cap flange and said seal surface on said pipe connection being an annular groove, and the peripheral portions of said snap ring being disposed in said annular groove.

3. The exhaust arrangement of claim 1, wherein said exhaust means includes a muffler located within said enclosure, said outlet pipe being provided on said muffler.

4. The exhaust arrangement of claim 3, wherein said cover member is a generally cup-shaped cover plate movable along said exhaust pipe and said first means includes a helical spring and a sleeve which sealingly encircles said cover plate, is axially slidable relative to said cover plate and has an inwardly turned edge at the end thereof nearest said muffler, said inwardly turned edge being disposed against said muffler, said helical spring encircling said exhaust pipe within said sleeve, having its ends respectively engaging said cover plate and said inwardly turned edge of said sleeve, and resiliently urging said inwardly turned edge of said sleeve against said muffler and said cover plate against said seal surface.

5. The exhaust arrangement of claim 3, wherein said cover member is a flat ring movable along said exhaust pipe and said first means includes a helical spring which encircles said exhaust pipe between said flat ring and said muffler, has its ends respectively engaging said flat ring and said muffler, and urges said flat ring into sealing engagement with said seal surface.

* * * * *

UNITED STATES PATENT AND TRADEMARK OFFICE
CERTIFICATE OF CORRECTION

PATENT NO. : 4 341 187

DATED : July 27, 1982

INVENTOR(S) : Erich Absenger

It is certified that error appears in the above—identified patent and that said Letters Patent is hereby corrected as shown below:

Col. 2, line 55; change "on said of said" to ---on said end of said---.

Signed and Sealed this

*Twenty-sixth* Day of *October 1982*

[SEAL]

*Attest:*

GERALD J. MOSSINGHOFF

*Attesting Officer* *Commissioner of Patents and Trademarks*